(12) United States Patent
Frager (10) Patent No.: US 9,271,453 B2
(45) Date of Patent: Mar. 1, 2016

(54) ANCHORING DEVICE FOR SELF-PROPELLED IRRIGATION SYSTEM

(71) Applicant: Polaris Products LLC, Fairbury, NE (US)

(72) Inventor: James R. Frager, Fairbury, NE (US)

(73) Assignee: Polaris Products LLC, Fairbury, NE (US)

( * ) Notice: Subject to any disclaimer, the term of this patent is extended or adjusted under 35 U.S.C. 154(b) by 0 days.

(21) Appl. No.: 14/511,028

(22) Filed: Oct. 9, 2014

(65) Prior Publication Data

US 2015/0097062 A1    Apr. 9, 2015

Related U.S. Application Data

(60) Provisional application No. 62/046,780, filed on Sep. 5, 2014, provisional application No. 61/888,590, filed on Oct. 9, 2013.

(51) Int. Cl.
| | |
|---|---|
| *A01G 25/09* | (2006.01) |
| *E02D 5/56* | (2006.01) |
| *E02D 5/80* | (2006.01) |
| *E02D 7/22* | (2006.01) |

(52) U.S. Cl.
CPC .................................... *A01G 25/092* (2013.01)

(58) Field of Classification Search
CPC ... A01G 25/09; A01G 25/092; A01G 25/095; A01G 25/097; B05B 3/18; E01H 12/2215; E01H 12/2223; E01H 12/223; E02D 5/74; E02D 5/80; E02D 5/801
See application file for complete search history.

(56) References Cited

U.S. PATENT DOCUMENTS

| | | | | |
|---|---|---|---|---|
| 6,431,475 B1* | 8/2002 | Williams | ............... | A01G 25/09 239/740 |
| 7,303,157 B1* | 12/2007 | Fixemer | ............... | A01G 25/092 239/723 |
| 7,438,243 B1* | 10/2008 | Erickson | ............... | A01G 25/092 239/723 |
| 8,998,162 B1* | 4/2015 | Gutha | ................. | A01G 25/09 239/735 |
| 2009/0084615 A1* | 4/2009 | Parod | ................. | A01G 25/092 180/2.2 |
| 2014/0360107 A1* | 12/2014 | Bainter | ............... | A01G 25/092 52/157 |
| 2015/0121770 A1* | 5/2015 | Korus | ................. | E02D 5/80 52/1 |

* cited by examiner

*Primary Examiner* — Darren W Gorman
(74) *Attorney, Agent, or Firm* — Jeffrey L. Thompson; Thompson & Thompson PA (57) ABSTRACT

An anchoring device for a self-propelled irrigation system includes a screw pile and drive assembly that drives the screw pile into the ground to anchor a drive tower of the irrigation system to the ground. The screw pile is rotatably driven about a vertical axis and movable vertically relative to the drive tower. The drive assembly can include an electric motor with a suitable gear reduction that causes the screw pile to be rotated slowly with a large amount of torque. The drive assembly can be mounted stationary to the drive tower, or it can be mounted on tracks so as to move vertically together with the screw pile. A low voltage electrical system with one or more batteries can be used to power the electric motor. A solar battery charger or other charging system can be used to maintain an electrical charge in the batteries. A controller is provided to activate the drive assembly when adverse weather conditions are detected, or upon receiving a remote command from the operator.

12 Claims, 6 Drawing Sheets

ANCHORING DEVICE FOR SELF-PROPELLED IRRIGATION SYSTEM

RELATED APPLICATIONS

This application claims the benefit of U.S. Provisional Patent Application No. 61/888,590 filed on Oct. 9, 2013, and U.S. Provisional Patent Application No. 62/046,780 filed on Sep. 5, 2014. The entire contents of these priority applications are incorporated herein by reference.

BACKGROUND OF THE INVENTION

1. Field of the Invention

This invention relates generally to self-propelled irrigation systems, and in particular, to methods and devices for preventing self-propelled irrigation systems from overturning in high wind situations.

2. Description of the Related Art

Self-propelled irrigation systems are used to provide water for agricultural purposes in arid regions. Typically, such systems include a series of spaced drive towers connected by truss sections that support an elongated water distribution pipeline between the towers. In center pivot systems, the water distribution pipe extends radially from a central pivot connected to a water supply. In linear move irrigation systems, the water distribution pipe extends laterally from a canal feed or hose drag system that provides the water supply.

Water passing through the distribution pipeline is forced out through a number of sprinkler heads, spray guns, drop nozzles, or the like spaced along the length of the pipe. Each drive tower in the system is supported on wheels or other structures that are driven at slow speeds to move the tower in a circular path about the central pivot, or a linear path in the case of linear move systems, to irrigate an agricultural field.

Such irrigation systems are prone to being damaged during severe weather by high winds that cause one or more towers of the irrigation system to overturn. When a tower overturns, major damage to the pipeline, truss sections, and other components typically occurs, resulting in significant downtime and expense.

Screw piles are known in the prior art and are used, for example, in ground anchoring systems for building foundations. Screw piles can be wound into the ground much like a screw into wood. Screw piles are sometimes referred to as screw-in foundations, screw piers, helical piles, helical anchors, screw anchors, screw foundations and helical piers.

A need exists in the agricultural industry for a system that prevents sprinkler systems from overturning and becoming damaged during windstorms.

SUMMARY OF THE INVENTION

An object of the present invention is to provide an anchoring device for preventing a self-propelled irrigation system from overturning in high winds.

A further object of the present invention is to provide a self-propelled irrigation system that resists overturning in high winds.

A further object of the present invention is to provide an anchoring device for use on a self-propelled irrigation system that uses a screw pile and a drive motor mounted on the irrigation system to anchor the irrigation system to the ground during high wind conditions.

A still further object of the present invention is to provide an anchoring device for a self-propelled irrigation system with a control system to automatically activate the anchoring device upon detecting a wind speed exceeding a predetermined threshold speed.

A still further object of the present invention is to provide an anchoring device that can be adapted to and used on a variety of different brands and types of self-propelled irrigation systems.

To accomplish these and other objects of the present invention, an anchoring device for a self-propelled irrigation system is provided. The anchoring device includes a screw pile and a drive assembly that drives the screw pile into the ground to anchor a drive tower of the irrigation system to the ground. The screw pile is rotatably driven about a vertical axis and movable vertically relative to the drive tower. The drive assembly can include an electric motor with a suitable gear reduction that causes the screw pile to be rotated slowly with a large amount of torque. The drive assembly can be mounted stationary to the drive tower, or it can be mounted on tracks so as to move vertically together with the screw pile. A low voltage electrical system with one or more batteries can be used to power the electric motor. A solar battery charger or other charging system can be used to maintain an electrical charge in the batteries. A controller is provided to activate the drive assembly when adverse weather conditions are detected, or upon receiving a remote command from the operator.

According to one aspect of the present invention, an anchoring device for a self-propelled irrigation system is provided, comprising: a screw pile supported on the irrigation system and arranged to be raised and lowered relative to the irrigation system; and a drive motor arranged to rotate the screw pile to wind the screw pile into the ground to anchor the irrigation system to prevent overturning during severe weather.

According to another aspect of the present invention, a self-propelled irrigation system that resists overturning in high winds is provided, comprising: an elongated pipeline supported above a field by at least one drive tower, the drive tower comprising a base beam assembly, a tower structure supported by and extending above the base beam assembly for supporting the elongated water pipeline above the base beam assembly, and a plurality of drive assemblies for supporting and propelling the base beam assembly over a field; and an anchoring device for anchoring the drive tower to the ground. The anchoring device comprises: a screw pile supported on the drive tower and arranged to be raised and lowered relative to the irrigation system; and a drive motor arranged to rotate the screw pile to wind the screw pile into the ground to anchor the irrigation system to the ground to prevent overturning during severe weather.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

A self-propelled irrigation system 10 equipped with anchoring devices 20 according to the present invention will now be described with reference to FIGS. 1 to 11 of the accompanying drawings.

Figure 1:
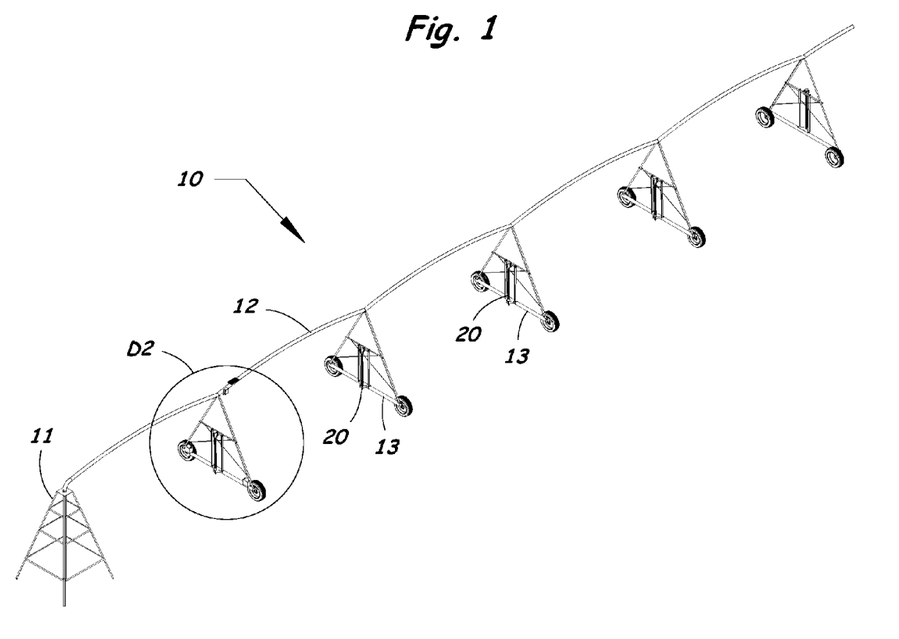
FIG. 1 is a perspective view of a center pivot-type self-propelled irrigation system equipped with anchoring devices according to the present invention.

The self-propelled irrigation system 10 includes a center pivot structure 11, an elongated water pipeline 12, and a plurality of drive towers 13 for supporting the water pipeline 12 above a field. The drive towers 13 and water pipeline 12 are arranged to move around the center pivot structure 11, which remains at a fixed location. However, it should be appreciated that the present invention can also be used with other types of self-propelled irrigation systems, such as lateral move irrigation systems and corner pivot irrigation systems, which are well known in the art.

Figure 2:
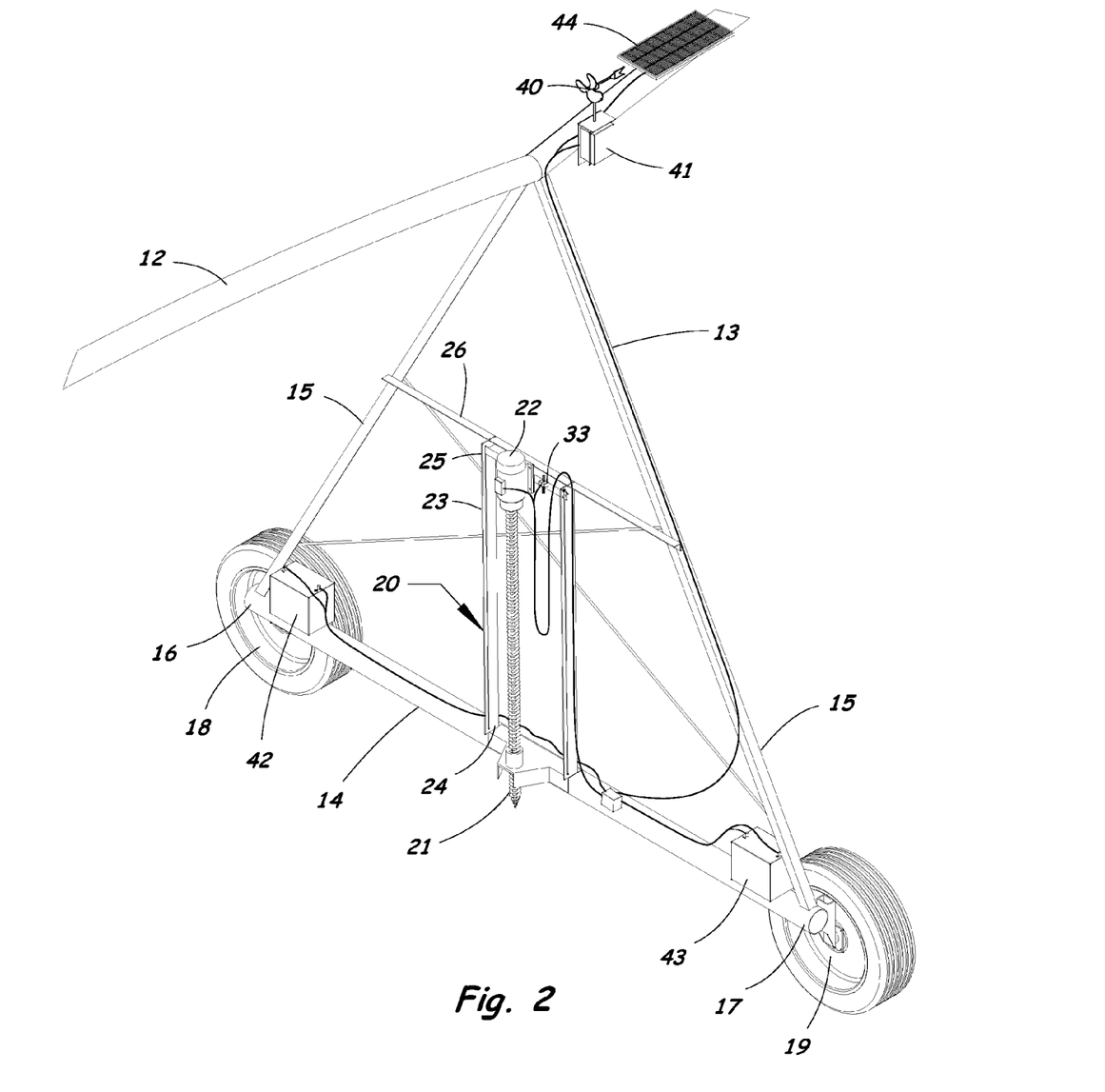
FIG. 2 is a detail perspective view of the area D2 shown in FIG. 1.

The drive towers 13 each include a frame assembly comprising a base beam 14 and a tower structure 15 that extends upwardly from opposite ends 16, 17 of the base beam 14. The water pipeline 12 is supported by the tower structure 15 above the base beam 14 in a conventional fashion. First and second drive assemblies 18, 19 are mounted to respective ends 16, 17 of the base beam 14 for supporting and propelling the frame assembly over a field. For example, each drive assembly 18, 19 may comprise a gear box and a hub and wheel assembly. An electric motor or hydraulic drive is typically used to provide power to the drive assemblies 18, 19.

In the illustrated embodiment, the wheel assemblies 18, 19 positioned at each end of the base beam 14 are sufficiently far apart to provide a stable support for the system during normal weather conditions. However, in high wind conditions, the drive tower 13 will tend to tip about the wheel assembly 18, 19 on the downwind side of the system 10. The present invention provides a solution to the overturning tendency by using a powered anchoring device 20 to anchor the drive tower 13 to the ground.

Figure 3:
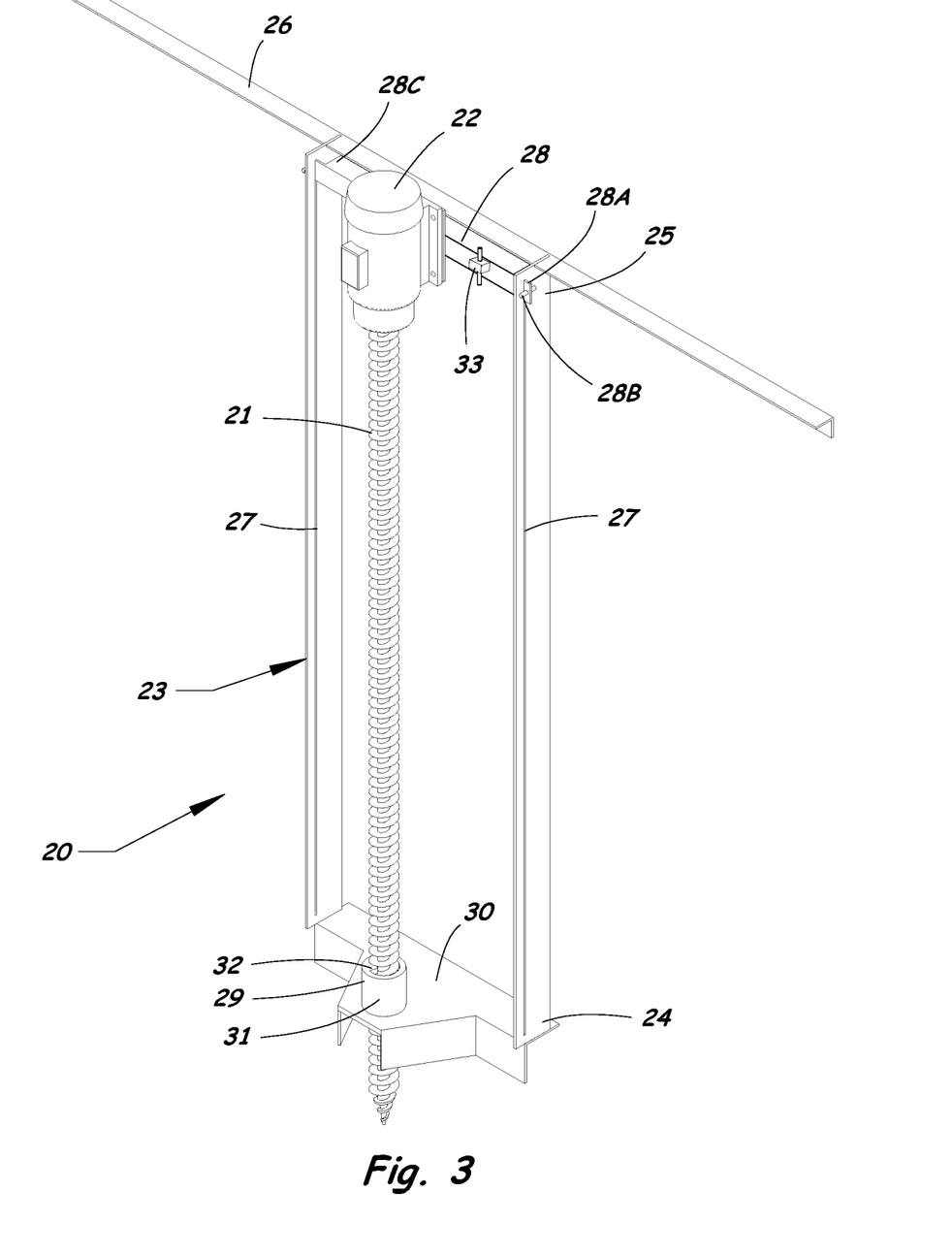
FIG. 3 is a perspective view of an anchoring device for self-propelled irrigation systems according to the present invention.
Figure 4:
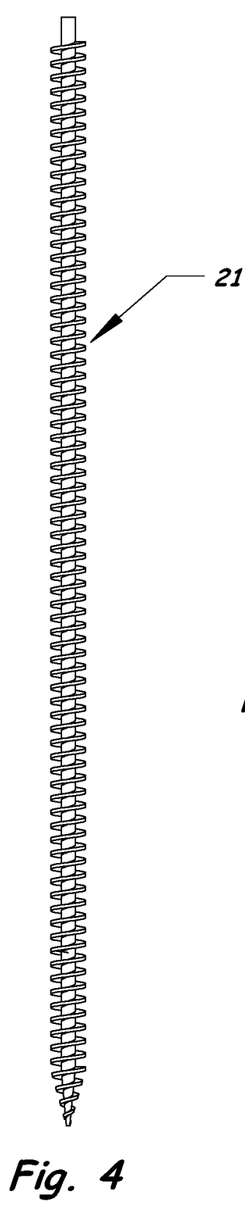
FIG. 4 is an elevation view of a screw pile used in the anchoring device.
Figure 5:
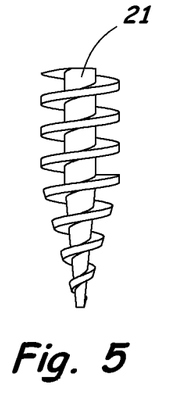
FIG. 5 is a detail view of a lower portion of the screw pile shown in FIG. 4.

The anchoring device 20 includes a screw pile 21 supported on the drive tower 13 and arranged to be raised and lowered relative to the drive tower 13. A drive motor 22 is provided to rotate the screw pile 21 in a first direction to wind the screw pile 21 into the ground to anchor the drive tower 13 to the ground. The drive motor 22 will also rotate the screw pile 21 in a second direction to unwind the screw pile 21 to retract the screw pile 21 from the ground after the high wind conditions subside.

In the embodiment shown in FIGS. 1 to 7, a slide mounting assembly 23 is used to mount the screw pile 21 and drive motor 22 to the drive tower 13. The mounting assembly 23 has a lower end 24 connected to the base beam 14 and an upper end 25 connected to a support member 26 attached to the tower structure 13. For example, the support member 26 may comprise a length of angle iron extending between the upright support structures 15 of the drive tower 13.

The mounting assembly 23 has a pair of vertically extending tracks 27 that extend between the base beam 14 and the support member 26 to support the drive motor 22 while allowing vertical movement thereof relative to the drive tower 13. A follower member 28 protrudes from opposite sides of the drive motor 22 and is guided for vertical movement by the vertically extending tracks 27 as the drive motor 22 is raised and lowered relative to the drive tower 13. The following member 28 can be, for example, a length of angle iron that spans between the tracks 27 with flat ends 28A that protrude outwardly through the tracks 27. A pin 28B or other suitable structure can be provided in each of the flat ends 28A of the following member 28 to keep the flat ends 28A of the following member 28 within the tracks 27. The following member 28 can also be provided with inner shoulders 28C near its outer ends that engage inner sides of the tracks 27 to limit the amount of side-to-side movement of the following member 28 between the tracks 27.

Figure 6:
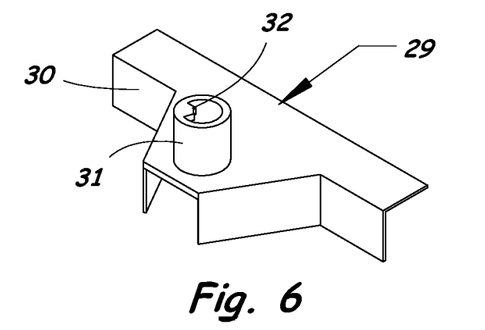
FIG. 6 is a perspective view of a pile engaging and guiding member used in the anchoring device.
Figure 7:
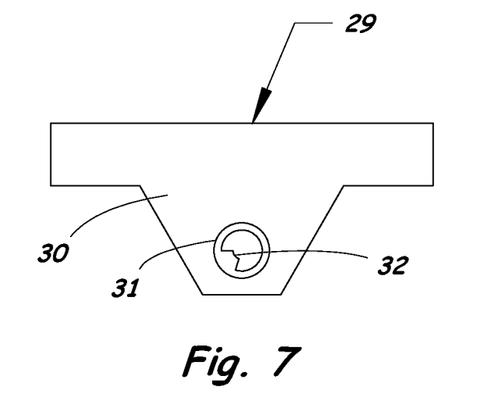
FIG. 7 is a top plan view of the pile engaging and guiding member shown in FIG. 6.

The mounting assembly 23 also includes a pile engaging member 29 that engages and guides the screw pile 21 and restricts movement of the screw pile 21 in a vertical direction relative to the base beam 14 of the drive tower 13. The pile engaging member 29 includes a lower bracket 30 attached to the base beam 14 with a hole through which the screw pile 21 passes. The pile engaging member 29 also includes a tube segment 31 attached to the lower bracket 30 and aligned with the hole in the lower bracket 30. The tube segment 31 has a projection 32 that extends radially inward from a side wall of the tube segment 31 to engage the helical structure on the screw pile 21 and prevent the screw pile 21 from passing through the tube segment 21 in a vertical direction unless the screw pile 21 is being rotated. Alternatively, a female thread or helical flighting can be provided within the tube segment 31 to provide a similar function to the projection 32 in the illustrated embodiment.

An upper/lower limit switch 33 is provided for sensing when the screw pile 21 reaches its upper and lower limits of movement. The limit switch 33 can be positioned on the following member 28 or other structure that moves vertically up and down with the screw pile 21. The limit switch 33 is positioned so that it engages a first stationary stop as the screw pile 21 reaches its upper limit of movement, and engages a second stationary stop as the screw pile 22 reaches its lower limit of movement. The limit switch 33 functions to stop the drive motor 22 to prevent the drive motor 22 from continuing to rotate upon the screw pile 21 reaching its upper or lower limits of movement. Alternatively, stationary upper and lower limit switches can be mounted near the respective upper and lower ends of the slide mounting assembly 23 to provide the same function as the upper/lower limit switch 33.

An anchoring device 120 according to another embodiment of the invention is illustrated in FIGS. 8 to 11. In this embodiment, a drive motor 122 is mounted stationary to the base beam assembly 14, and a screw pile 121 is raised and lowered relative to the drive motor 122 and the drive tower 13 during operation. The drive motor 122 is operably connected to the screw pile 121 using a suitable gear reduction and drive assembly 123 that allows the screw pile 121 to be rotatably driven by the motor 122 while moving vertically into and out of contact with the ground.

Figures 8, 9:
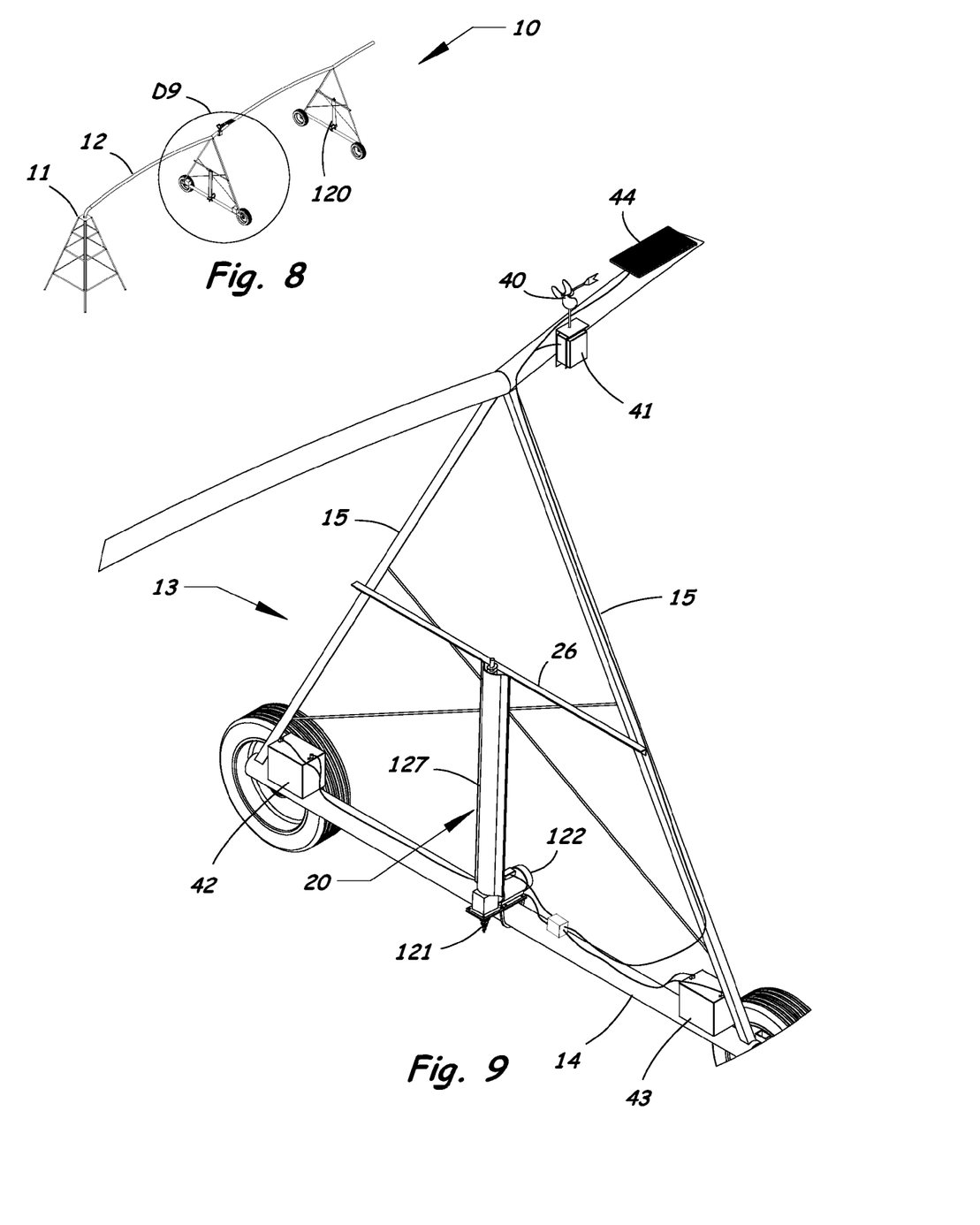
FIG. 8 is a perspective view of a center pivot-type self-propelled irrigation system equipped with anchoring devices according to another embodiment of the present invention.
FIG. 9 is a detail perspective view of the area D9 shown in FIG. 8.
Figure 10:
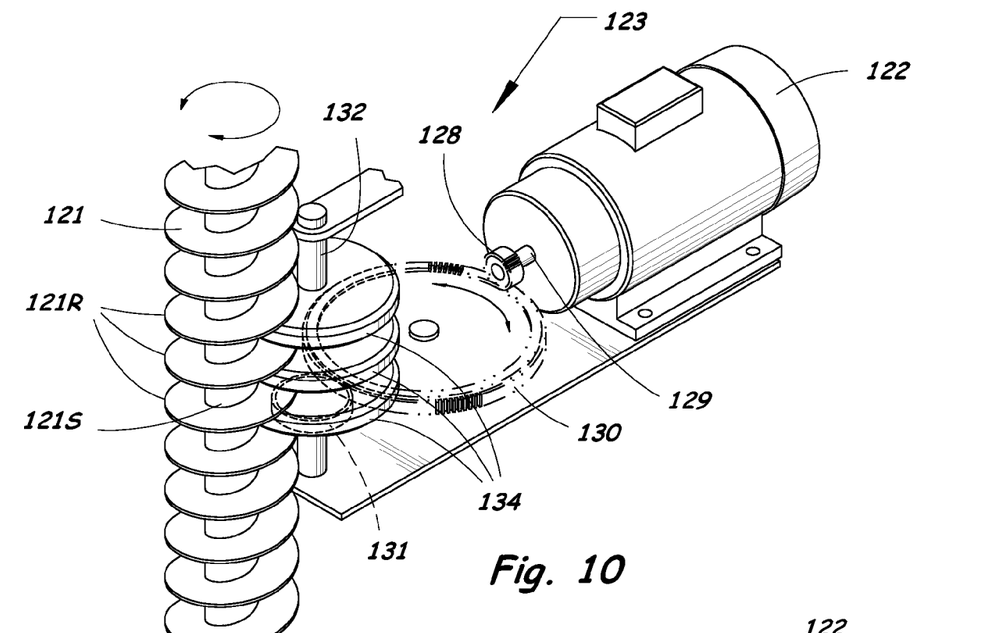
FIG. 10 is a perspective view of a screw pile driving system in which the drive motor is mounted stationary relative to the irrigation system.

A pile guide structure 127 is provided above the drive motor 122 for maintaining the screw pile 121 in a vertical orientation. The pile guide structure 127 can be, for example, front and rear sheets of metal that are bowed to accommodate the diameter of the screw pile 121 and attached along their side edges to form a tubular structure. Alternatively, a tubular member, such as a plastic or metal tube, can be used for the pile guide structure 127.

FIG. 10 illustrates one embodiment of a drive motor 122 and drive assembly 123 for rotating the screw pile 121 and causing the screw pile 121 to move vertically relative to the drive motor 122. In this embodiment, a first gear 128 is mounted on the drive shaft 129 of the motor 122, a second gear 130 is rotatably driven by the first gear 128, and a third gear 131 is driven by the second gear 130. The second gear 130 is larger than the first gear 128 to provide a suitable gear reduction for the drive motor 122. The third gear 131 is fixed on a shaft 132 with a pile engaging structure 133 that rotates together with the third gear 131 to engage and rotate the screw pile 121. The pile engaging structure 133 has at least one, and preferably multiple, engaging wheels 134 that fit between the adjacent helical rings 121R of the screw pile 121 to engage and drive the inner shaft 121S of the screw pile 121.

In operation, as the motor 122 rotates in one direction, the screw pile 121 rotates and moves vertically downward until it augers into the soil. As the motor 122 turns in the other direction, the screw pile 121 rotates and moves vertically upward out of the soil and into its raised position. Upper and lower limit switches can be used in this embodiment to ensure that the drive motor 122 stops when the screw pile 121 reaches its upper and lower limits.

Figure 11:
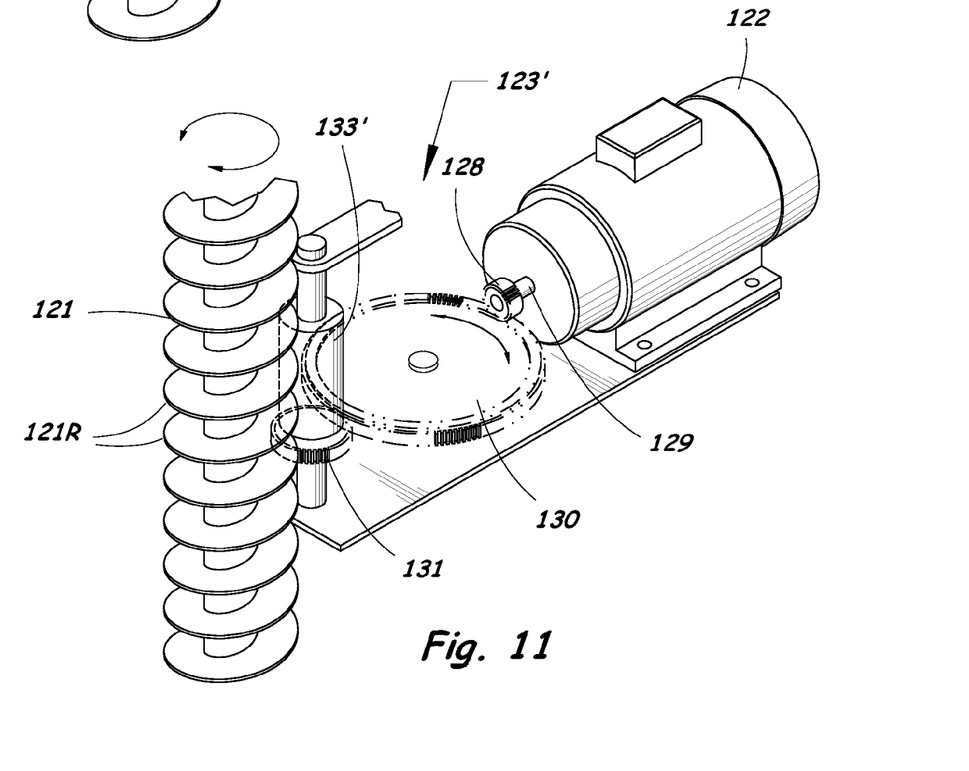
FIG. 11 is a perspective view of another screw pile driving system that allows the drive motor to be mounted stationary relative to the irrigation system.

FIG. 11 illustrates another embodiment of a drive motor 122 and drive assembly 123' for rotating the screw pile 121 and causing the screw pile 121 to move vertically relative to the drive motor 122. This embodiment is similar to the embodiment illustrated in FIG. 10, except that the pile engaging structure 133' engages an outer surface of the helical rings 121R of the screw pile 121 to rotate the screw pile 121.

As illustrated in FIGS. 2 and 9, an anemometer 40 can be placed on the irrigation system 10 to determine when wind speeds exceed a predetermined threshold. A controller 41 can be connected to the anemometer 40 to automatically activate the drive motor 22, 122 to deploy the screw pile anchoring device 21, 121 into the ground whenever wind speeds exceed the threshold wind speed. For example, the threshold wind speed can be set at 60 mph by programming the controller 41, so that whenever the measured wind speed meets or exceeds 60 mph, the controller 41 causes the screw pile 21, 121 of the anchoring device to be automatically screwed into the ground. The controller 41 can also be used to energize the drive motor 22, 122 remotely using a cell phone, or to allow a user to manually start and stop the drive motor 22, 122.

The drive motor 22, 122 can be powered by a high voltage electricity source that is typically available on the sprinkler, or the drive motor 22, 122 can be powered by one or more low voltage DC batteries dedicated to that purpose. FIGS. 2 and 9 illustrate the use of a pair of 12V automotive batteries 42, 43 to supply low voltage power (e.g., 12V or 24V) to the drive motor 22, 122. A solar charger 44 can be mounted on the irrigation system to keep the batteries 42, 43 charged. In same cases, a single battery will provide sufficient power, while in other cases multiple batteries may be needed.

The drive motor 22, 122 of the anchoring device of the present invention can be powered by high or low voltage electric systems, as explained above, or alternatively by hydraulic or pneumatic systems. For example, a self-propelled irrigation system with hydraulically driven support towers can be equipped with an anchoring device with a hydraulic drive motor so that the existing hydraulic system be used to power the anchoring device.

While the invention has been specifically described in connection with specific embodiments thereof, it is to be understood that this is by way of illustration and not of limitation, and the scope of the appended claims should be construed as broadly as the prior art will permit.

What is claimed is:

1. An anchoring device for a self-propelled irrigation system, comprising:
   a screw pile supported on the irrigation system and arranged to be raised and lowered relative to the irrigation system; and
   a drive motor arranged to rotate the screw pile to wind the screw pile into the ground to anchor the irrigation system to the ground to prevent overturning during severe weather;
   wherein said drive motor is mounted stationary relative to said irrigation system, and said screw pile is raised and lowered relative to said drive motor.

2. The anchoring device according to claim 1, further comprising a control system that automatically activates the anchoring device upon detecting a wind speed exceeding a predetermined threshold speed.

3. The anchoring device according to claim 1, further comprising at least one DC battery for powering said drive motor, and a solar charger for keeping the battery charged.

4. The anchoring device according to claim 1, further comprising a control system that allows the drive motor to be energized remotely using a cell phone.

5. The anchoring device according to claim 1, wherein said drive motor is operable to rotatably drive the screw pile in a first direction for winding the screw pile into the ground to an anchoring position, and in a second direction for unwinding the screw pile to retract the screw pile from the ground.

6. A self-propelled irrigation system that resists overturning in high winds, comprising:
   an elongated pipeline supported above a field by at least one drive tower, said drive tower comprising a base beam assembly, a tower structure supported by and extending above said base beam assembly for supporting the elongated water pipeline above the base beam assembly, and a plurality of drive assemblies for supporting and propelling the base beam assembly over a field; and
   an anchoring device for anchoring the drive tower to the ground, said anchoring device comprising:
      a screw pile supported on the drive tower and arranged to be raised and lowered relative to the irrigation system; and
      a drive motor arranged to rotate the screw pile to wind the screw pile into the ground to anchor the irrigation system to the ground to prevent overturning during severe weather;
   wherein said drive motor is mounted stationary to said base beam assembly, and said screw pile is raised and lowered relative to said drive motor.

7. The self-propelled irrigation system according to claim 6, further comprising a control system that automatically activates the anchoring device upon detecting a wind speed exceeding a predetermined threshold speed.

8. The self-propelled irrigation system according to claim 6, further comprising at least one DC battery for powering said drive motor, and a solar charger for keeping the battery charged.

9. The self-propelled irrigation system according to claim 6, further comprising a control system that allows the drive motor to be energized remotely using a cell phone.

10. The self-propelled irrigation system according to claim 6, wherein said drive motor is operable to rotatably drive the screw pile in a first direction for winding the screw pile into the ground to an anchoring position, and in a second direction for unwinding the screw pile to retract the screw pile from the ground.

11. An anchoring device for a self-propelled irrigation system, comprising:
   a screw pile supported on the irrigation system and arranged to be raised and lowered relative to the irrigation system; and
   a drive motor arranged to rotate the screw pile to wind the screw pile into the ground to anchor the irrigation system to the ground to prevent overturning during severe weather;
   wherein said drive motor is mounted stationary relative to said irrigation system, and a drive structure is arranged to transfer rotational force from said drive motor to said screw pile to rotate said screw pile and cause said screw pile to be lowered and raised relative to said drive motor while rotating in first and second directions, respectively.

12. A self-propelled irrigation system that resists overturning in high winds, comprising:
   an elongated pipeline supported above a field by at least one drive tower, said drive tower comprising a base beam assembly, a tower structure supported by and extending above said base beam assembly for supporting the elongated water pipeline above the base beam assembly, and a plurality of drive assemblies for supporting and propelling the base beam assembly over a field; and
   an anchoring device for anchoring the drive tower to the ground, said anchoring device comprising:
   a screw pile supported on the drive tower and arranged to be raised and lowered relative to the irrigation system; and
   a drive motor arranged to rotate the screw pile to wind the screw pile into the ground to anchor the irrigation system to the ground to prevent overturning during severe weather;
   wherein said drive motor is mounted stationary relative to said irrigation system, and a drive structure is arranged to transfer rotational force from said drive motor to said screw pile to rotate said screw pile and cause said screw pile to be lowered and raised relative to said drive motor while rotating in first and second directions, respectively.

\* \* \* \* \*